US010996467B2

(12) United States Patent
James et al.

(10) Patent No.: US 10,996,467 B2
(45) Date of Patent: May 4, 2021

(54) HEAD-MOUNTED DISPLAY AND CONTROL APPARATUS AND METHOD (71) Applicant: BAE Systems plc, London (GB)

(72) Inventors: Ian Geoffrey James, Preston (GB); Edmond Richard Ridge, Preston (GB); David John Simm, Preston (GB); Malcolm Grant Pigott, Preston (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 16/643,769

(22) PCT Filed: Sep. 10, 2018

(86) PCT No.: PCT/GB2018/052560
§ 371 (c)(1),
(2) Date: Mar. 2, 2020

(87) PCT Pub. No.: WO2019/048885
PCT Pub. Date: Mar. 14, 2019

(65) Prior Publication Data
US 2020/0218066 A1 Jul. 9, 2020

(30) Foreign Application Priority Data

Sep. 11, 2017 (EP) .................................. 17190442
Sep. 11, 2017 (GB) .................................. 1714572

(51) Int. Cl.
G02B 27/00 (2006.01)
G02B 27/01 (2006.01)
(Continued)

(52) U.S. Cl.
CPC ....... G02B 27/0093 (2013.01); G02B 27/017 (2013.01); G06F 3/012 (2013.01); G06F 3/013 (2013.01); G06T 19/006 (2013.01)

(58) Field of Classification Search
CPC ... G02B 27/0093; G02B 27/017; G06F 3/012; G06F 3/013; G06F 3/0482; G06F 3/011; G06T 19/006
See application file for complete search history.

(56) References Cited

U.S. PATENT DOCUMENTS 4,109,145 A * 8/1978 Graf ....................... A61B 3/113
250/221
2012/0287040 A1* 11/2012 Moore ................... A42B 3/042
345/157
(Continued)

FOREIGN PATENT DOCUMENTS

EP 3188607 A1 3/2017
WO 2015108887 A1 7/2015

OTHER PUBLICATIONS

Extended European Search Report for Application No. 17190442.8 dated Feb. 26, 2018, 8 pages.
(Continued)

Primary Examiner — Brent D Castiaux
(74) Attorney, Agent, or Firm — Maine Cernota & Rardin (57) ABSTRACT An apparatus and method for displaying an operational area, the apparatus comprising a headset (10) for placing over a user's eyes, the headset including a viewing device (12) configured to provide to said user, in use, a view of a real-world environment, a display generating device for depicting an operational area, said operational area being defined within said real-world environment and comprising a plurality of functional regions each defining a different one or more selectable functions or operations that can be performed in respect of said operational area, the apparatus being configured to transfer image data from said display generating device into said user's view of said real-world environment at said viewing device to generate an augmented reality environment, the apparatus further compris-
(Continued)

ing a control module (26) including a control device (28) configured to be selectively communicably coupled to all of said functional regions to enable a user to selectively perform the respective one or more functions or operations associated therewith, wherein the control device (28) is communicably coupled to a selected functional region only in response to a respective actuation signal, and an eye tracker module (24) configured to monitor said user's gaze relative to said augmented reality environment, in use, and, when said user's gaze is directed at a selected functional region displayed therein, generate and transmit to said control module (26) a said actuation signal and when said user's gaze is no longer directed at said selected functional region, cause said control device (28) to be decoupled therefrom.

13 Claims, 4 Drawing Sheets

(51) Int. Cl.
*G06F 3/01* (2006.01)
*G06T 19/00* (2011.01)

(56) References Cited

U.S. PATENT DOCUMENTS

| | | |
|---|---|---|
| 2013/0007668 A1* | 1/2013 | Liu .................. G06F 3/0482 715/841 |
| 2013/0162632 A1 | 6/2013 | Varga et al. |
| 2014/0237366 A1 | 8/2014 | Poulos et al. |
| 2014/0278033 A1 | 9/2014 | Scofield |
| 2016/0011668 A1 | 1/2016 | Garaas |
| 2016/0246384 A1* | 8/2016 | Mullins ................ G06F 3/011 |

OTHER PUBLICATIONS

Great Britain Search Report for Application No. 1714572.3 dated Feb. 9, 2018, 3 pages.

International Preliminary Report on Patentability for Application No. PCT/GB2018/052560 dated Mar. 17, 2020, 9 pages.

* cited by examiner

HEAD-MOUNTED DISPLAY AND CONTROL APPARATUS AND METHOD

RELATED APPLICATIONS

This application is a national phase application filed under 35 USC § 371 of PCT Application No. PCT/GB2018/052560 with an International filing date of Sep. 10, 2018 which claims priority of GB Patent Application 1714572.3 filed Sep. 11, 2017 and EP Patent Application 17190442.8 filed Sep. 11, 2017. Each of these applications is herein incorporated by reference in its entirety for all purposes.

FIELD OF THE INVENTION

This invention relates generally to a head-mounted display apparatus and method and, more particularly, to a head-mounted display apparatus and method incorporating a control module for enabling a user to interact with regions of an operational area displayed on a head-mounted display screen.

BACKGROUND OF THE INVENTION

It is known, particularly in the field of military fighter aircraft and the like, to provide a helmet-mounted display (HMD), wherein a helmet having a transparent visor is provided with a display generating device, such as an internal screen, such that the wearer can view their real-world environment, whilst also viewing additional images and/or data in a virtual reality format displayed on the screen and projected into the wearer's view of the external real-world environment through the visor. As such, a processor is provided that receives real-time data from multiple sources, such as external image capture devices, speed sensors, weapon sensors, or target tracking systems, and generates two-dimensional image data representative of that data. The image data is displayed on the screen in the form of representative images, and then projected onto the wearer's view of the external real-world environment, thus effectively being superimposed on the wearer's real-world field of view through the visor assembly.

Platform operatives need to spend as much time as possible looking out of the platform to maintain safe operation. However, as missions become more complex and the quantity of data required to be assimilated increases accordingly, a careful balance needs to be maintained. Some of this data can be displayed within the operative's view of the real world, as described above, but putting displays in the operative's vision can be very dangerous, as it may obscure their view of a physical entity in the outside world or safety critical parameters in the head-up display (HUD) in the cockpit. The decision about whether to provide augmented reality information within the pilot's field of view through the helmet visor therefore has to outweigh the negative implications and, it is common for large amounts of such data to, instead, be displayed (or made available) on a head-down display (HDD) in the cockpit, which forces the operative to move their eyes away from the outside world to read the data. Furthermore, for interaction with each type of data, a different control device is typically required to be used, which results in a very complex control panel.

It would be desirable to provide a helmet-mounted display that is able to selectively display large amounts of data within the user's field of view, without requiring large numbers of control devices and, in accordance with a first aspect of the present invention, there is provided a head-mounted display apparatus for displaying an operational area, comprising a headset for placing over a user's eyes, the headset including a visor configured to provide to said user, in use, a view of a real-world environment, a display generating device for depicting an operational area, said operational area being defined within said real-world environment and comprising a plurality of functional regions each defining a different one or more selectable functions or operations that can be performed in respect of said operational area, the apparatus being configured to transfer image data from said display generating device into said user's view of said real-world environment at said viewing device to generate an augmented reality environment, the apparatus further comprising a control module including a control device configured to be selectively communicably coupled to all of said functional regions to enable a user to selectively perform the respective one or more functions or operations associated therewith, wherein the control device is communicably coupled to a selected functional region only in response to a respective actuation signal, and an eye tracker module configured to monitor said user's gaze relative to said augmented reality environment, in use, and, when said user's gaze is directed at a selected functional region, generate and transmit to said control module a said actuation signal and when said user's gaze is no longer directed at said selected functional region, cause said control device to be decoupled therefrom.

SUMMARY OF THE INVENTION

Thus, the present invention provides a head-mounted display apparatus that can effectively incorporate most or all of the data required for use by the operative, without unnecessarily obscuring their view and requiring only a single (or very few) control devices to interact with that data, thereby simplifying the control panel and providing a much more intuitive display system.

In an exemplary embodiment, a plurality of operational areas may be defined within said real-world environment, each operational area being associated with a user's relative or absolute head position and/or orientation, the apparatus further comprising a head tracking module for tracking and determining a user's relative or absolute head position and/or orientation, the processor being configured to receive, from said head tracking module, data representative of said user's relative or absolute head position and/or orientation, determine a current operational area associated therewith and define one or more selectable functional regions associated with said current operational area included within said augmented reality environment.

In an exemplary embodiment, said viewing device is a transparent or translucent visor, such that the external and internal real-world environment can be viewed therethrough by the user, and the display generating device is arranged and configured to transfer image data displayed thereon into said user's view of the real-world environment such that the or each operational area is defined within the augmented reality environment.

The functional regions may be defined and displayed on the display generating device in the form of respective augmented reality information windows, with which the user can interact, using said control device, only when said augmented reality information window is displayed on the viewing device and/or the user's gaze is directed thereto. In some cases, the augmented reality information window will only become visible on the viewing device when the user directs their gaze at a predefined location in a respective operational area within the augmented reality environment, and only coupled to a control device whilst the user's gaze remains directed thereto. An augmented reality information window may be removed from the viewing device when the user directs their gaze away from that predefined location but, alternatively, it may remain on the viewing device and simply be decoupled from the control device(s) when the user's gaze is directed away from it. Whilst the user's gaze is directed to an augmented reality information window displayed on the screen, the control device can be used to interact with it, whereas, once the user's gaze is directed away from the augmented reality information window, it is decoupled from the control device(s) in this case, the augmented reality information window may be removed from the viewing device until the user directs their gaze at that predefined location again, or it could be left on the viewing device, decoupled from the control devices, until the user's gaze returns to it.

In another exemplary embodiment of the invention, the user can select one or more functional regions within a head-down display and move it into the display on the viewing device of the helmet-mounted display apparatus. Whilst the user's gaze is directed at a selected functional region so displayed within the augmented reality environment, the control device is coupled to, and can be used to, interact with it, whereas when the user's gaze moves away from the selected functional region it may be removed from the viewing device or it may be left on the viewing device, but either way the control device is decoupled therefrom. In some exemplary embodiments, once the functional region has been removed from the viewing device, it may remain as a selectable functional region in the respective operational area within the augmented reality environment, such that it is once again displayed on the viewing device when the user's gaze is directed thereto within the augmented reality environment and the control device will then, once again, be communicably coupled thereto.

In an exemplary embodiment, the apparatus comprises a smart interface comprising at least one, and preferably a (small) plurality of control devices, e.g. Hands on Throttle and Stick (HOTAS) control devices to selectively interact with all functional regions available to the user.

In accordance with another aspect of the present invention, there is provided a method of displaying an operational area, comprising providing a headset for placing over a user's eyes, the headset including a viewing device configured to provide to said user, in use, a view of a real-world environment, a display generating device for creating image data for depicting an operational area, said operational area being defined within said real-world environment, the display generating device being arranged and configured to transfer the image data into said user's view of said real-world environment through said visor to generate an augmented reality environment, the method further comprising providing a control module including a control device configured to be selectively communicably coupled to all of said functional regions to enable a user to selectively perform the respective one or more functions or operations associated therewith, wherein the control device is communicably coupled to a selected functional region only in response to a respective actuation signal, and an eye tracker module configured to monitor said user's gaze relative to said augmented reality environment, in use, and, when said user's gaze is directed at a selected functional region displayed therein, generate and transmit to said control module a said actuation signal and when said user's gaze is no longer directed at said selected functional region, cause said control device to be decoupled therefrom.

BRIEF DESCRIPTION OF THE DRAWINGS

These and other aspects of the present invention will be apparent from the following specific description, in which an embodiment of the present invention is described, by way of example only, and with reference to the accompanying drawings, in which.

DETAILED DESCRIPTION

Figure 1:
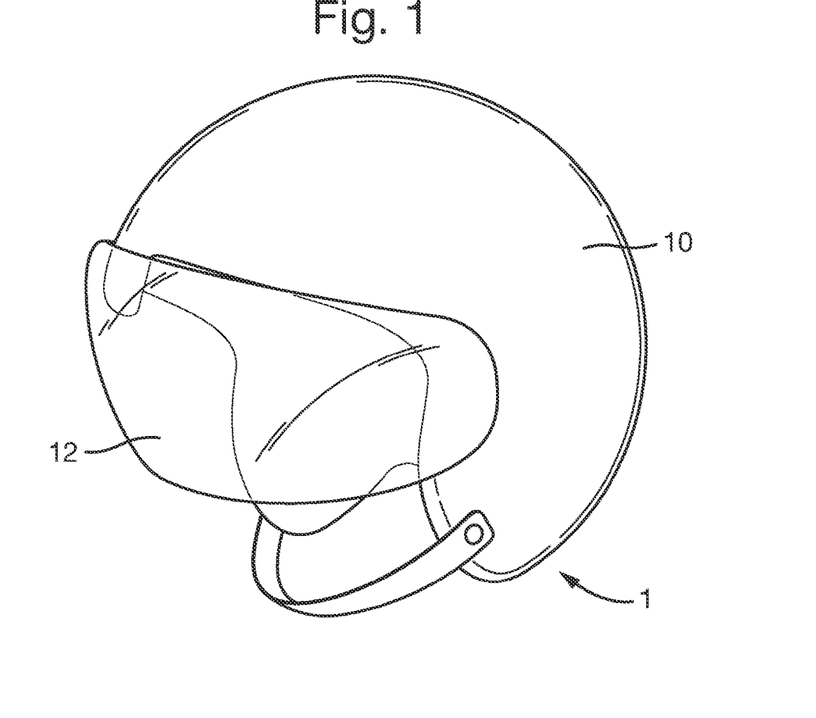
FIG. 1 is a helmet-mounted display apparatus according to an exemplary embodiment of the present invention.

Referring to FIG. 1 of the drawings, a display apparatus according to an exemplary embodiment of the present invention comprises an integrated two-part helmet-mounted display (HMD) 1 comprising a protective helmet 10 configured, in use, to cover the crown, back and sides of a wearer's head, and a see-through (translucent or transparent) visor 12, and a stereoscopic colour display screen (not shown in FIG. 1). The visor 12 extends between the side portions of the protective helmet 10 and is configured, in use, to cover a wearer's eyes such that they can see through the visor and the screen is arranged and configured to project images displayed thereon into the wearer's view of the real-world environment through the visor (via transmitted/reflected light), such that they can also see any symbology or images displayed on the screen. In an exemplary embodiment of the present invention, the screen provides a fully overlapped, 40-degree, binocular display. This type of helmet-mounted display assembly is known in the field of military aircraft.

The stereoscopic colour display screen comprises a first and second screen, one for each respective view. Each screen comprises an array of light emitting pixels for forming images, and in particular may be an organic light emitting diode (OLED) type screen.

The display apparatus of the invention includes a processor (not shown in FIG. 1), which may be incorporated into the helmet-mounted display assembly 1, but is more preferably located elsewhere in the aircraft, with an interface being provided on the helmet itself and coupled to the screen to define a data link between the processor and the screen, thus avoiding the additional weight on the helmet that the processor would otherwise represent. The helmet-mounted display assembly may include a head tracker system, wherein targets, e.g. transmitters such as LEDs (not shown in FIG. 1), on the helmet 10 are communicably coupled to fixed sensors on the aircraft. The sensors track the transmitters and generate representative signals such that the processor always 'knows' where the pilot is looking. Such head tracking technologies are known in the art, and will not be described in any further detail herein. Suffice it to say that it will be understood by a person skilled in the art that, in use, the wearer of the helmet-mounted display will be able to see through the visor 12 to obtain a view of the external (and internal) operational environment in whatever direction the wearer chooses to look. The processor, knowing the field of view of the visor and the direction in which the wearer's head is facing (plus the location and/or altitude of the host platform), can determine the precise operational area visible to the wearer at any time, and adapt the images displayed on the screen accordingly.

Figure 2:
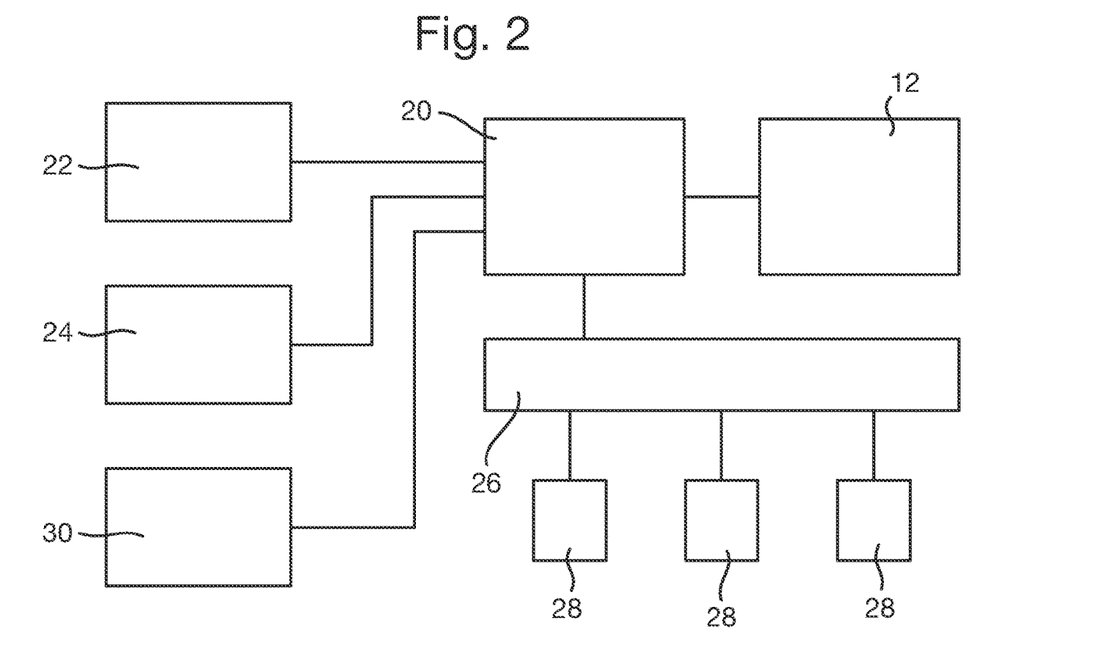
FIG. 2 is a schematic block diagram illustrating elements of an operational environment around a host platform.

Referring to FIG. 2 of the drawings, a display apparatus according to an exemplary embodiment of the present invention comprises a processor 20 communicably coupled to the screen 12 of the helmet-mounted display assembly.

The processor 20 is coupled to a head tracker module 22, which, as described above, comprises one or more transmitters, e.g. LEDs, within the helmet-mounted display assembly and one or more fixed sensors in the user's environment. For example, in the field of military fighter aircraft, it is known to provide transmitters such as LEDs on the helmet (10—FIG. 1) which are communicably coupled to fixed sensors on the aircraft (in the cockpit). Signals from the fixed sensors are processed by the head tracker module 22, and data representative of the pilot's head position and/or orientation is transmitted to the processor 20. Using, additionally, data representative of the aircraft's position and altitude, the processor 20 always 'knows' where the pilot is looking. The pilot's relative or absolute head position and/or orientation (and the aircraft's position and altitude) effectively enable the processor 20 to define the current operational area in terms of the external real-world environment currently visible to the pilot (at their head position/orientation).

In many cases, the defined operational area will dictate the functional regions available/relevant to the pilot. Thus, for example, if the defined operational area includes a target or other object identified by the on-board target detection/tracking devices, then one or more functional regions associated with that target/object may be available for selection. It is to be understood that, whilst in an exemplary embodiment of the present invention, a functional region is likely to comprise an information window, with which the pilot can interact (navigation and option selection) by means of a control device, the present invention is not necessarily limited in this regard. For example, the functional region may, in some exemplary embodiments or instances, simply comprise a passive information window that displays some sort of current information to the pilot.

In order to cause a particular functional region to be displayed on the visor 12 (i.e. superimposed on the user's view of the external real-world environment), the user directs their gaze at a particular location/point within their view of the current operational area. An eye tracking module 24 tracks the user's gaze and provides data representative thereof to the processor 20. The processor 20 processes the data from the eye tracker module 24 to monitor the user's gaze within the current operational area and, using an appropriate combination of head and eye position, it can determine if their gaze is directed at a specified location therein associated with a defined functional region. When the processor determines that the user's gaze is directed at that specified location (e.g. for a specified minimum period of time or in combination with operation of a control input), it causes an information window to be displayed on the screen, which is in turn superimposed on the visor and hence on the user's view of the external real-world environment.

If the information window displayed is one which allows/requires the user to interact with it (i.e. to navigate and select options), it transmits a signal to a control module 26 and the control module selects one of a (small) plurality of control devices 28, to allow the user to interact with the displayed information window they are looking at, as required.

When the user's gaze moves away from the specified location within the operational area (e.g. for a predefined minimum period of time), the processor may cause the information window to be removed from the display screen (and hence removed from the visor) but the information window may, alternatively, be left on the screen (and hence remain on the visor). Either way, the processor signals the control module 26 to decouple the selected control device from that information window.

In many applications, such as in the field of military aircraft, the pilot will have more than one display system available to them. Thus, in addition to a helmet-mounted display assembly ("head-out cockpit"), one or more additional display assemblies may be provided in the cockpit ("head-in cockpit displays") to accommodate the vast amount of data required by the pilot in order to complete a mission successfully. The or each of these head-in cockpit displays are additionally configured to display information windows with which the pilot can selectively interact using a control device. In accordance with an exemplary embodiment of the present invention, the display apparatus may be communicably coupled to one or more head-in cockpit display assemblies (e.g. head-down display 30) and, if it is required to interact with an information window thereon, the pilot can select the information window and 'drag' or otherwise move it onto the screen within their helmet-mounted display assembly. In this case, the data representative of the information window is transmitted to the processor 20, which causes the information window to be superimposed on the pilot's view of the external real-world environment. The processor 20 also transmits a signal to the control module 26 which couples one or more of the control devices 28 to that information window, thereby allowing the pilot to interact with it whilst it is displayed on the screen and the pilot's gaze is directed at it. When the pilot's gaze moves away from the location within the operational area at which the information is displayed (e.g. for a predefined minimum period of time or in combination with operation of a control input), the processor signals the control module 26 to decouple the selected control device(s) from that information window. In this case, the information window may remain displayed at that location within the augmented reality environment such that, if the pilot's gaze returns to that location (e.g. for a predetermined period of time or in combination with operation of a control input), the control device is once again coupled thereto to allow the pilot to interact with it.

Thus, a head-mounted display assembly according to an exemplary embodiment of the invention may use (e.g. colour) augmented reality information windows (ARIWs) to provide 'head-out' versions of conventional head-down displays. This allows, for example, the pilot to perform any task they previously had to perform 'head-in cockpit' to be performed 'head-out', thus enabling them to maintain situational awareness of other aircraft and terrain, for example, in the outside world whilst performing complex mission management tasks.

Use of the eye tracker module 24 means that information windows can be positioned where the pilot is focussing their attention and can be quickly repositioned (by means of a coupled control device) if required, to avoid unwanted obscuration of their view of the outside world. ARIWs can be quickly displayed and then removed from the screen within the helmet-mounted display, to give the pilot a rapid update to enhance their situational awareness without prolonged obscuration. Rapid display/removal, together with sensible use of colour (in some exemplary embodiments, at least) means that the obscuration of flight parameters can be minimised.

Indeed, in certain embodiments, a 'clear extraneous windows' command may be issued, via for example a dedicated button on the HOTAS, which toggles the removal of a predetermined selection of windows which could otherwise clutter the pilot's field of view.

Furthermore, use of the eye tracker module 24 means that the system 'knows' when the pilot is looking at a particular ARIW and can therefore predict if or when interaction therewith may be needed (via a control device). A smart interface is provided that includes the above-mentioned control module 26 and comprises a (small) plurality of, for example, Hands on Throttle and Stick (HOTAS) control devices 28 to interact with (only) the displayed ARIWs. These same control devices can then be used to perform other functions when the system detects that the pilot is not looking at a particular ARIW.

Whilst looking at an ARIW, the pilot can call up a menu on the ARIW which allows interaction with it. A combination of the eye tracker 24 and a HOTAS control module 26 and device 28 allow the menu to be navigated and the required option selected. Again, this allows complex mission management tasks to be performed head-out without the need for the pilot to look 'head-in cockpit', saving the pilot workload and improving aircraft safety.

Eye tracker technology is known. Eye tracking data may be collected using, in this case, a head mounted 'eye' tracker connected to a processor running eye-tracking analysis software. There are many different types of non-intrusive eye trackers, which generally comprise three principal components: namely one or more light sources, one or more cameras, and some form of analysis software. There are a number of known methods of analysing the collected eye tracking data, and the present invention is not necessarily intended to be limited in this regard. Such eye-tracking analysis methods will be known to a person skilled in the art, and will not be discussed in any further detail herein.

As explained above, an ARIW can be dragged into the augmented reality view of the user's external real-world environment displayed on the screen, or an ARIW can be selected directly within the augmented reality display of the external real-world environment by, for example, interacting with a displayed entity (e.g. track or other object known to the system).

Figure 3:
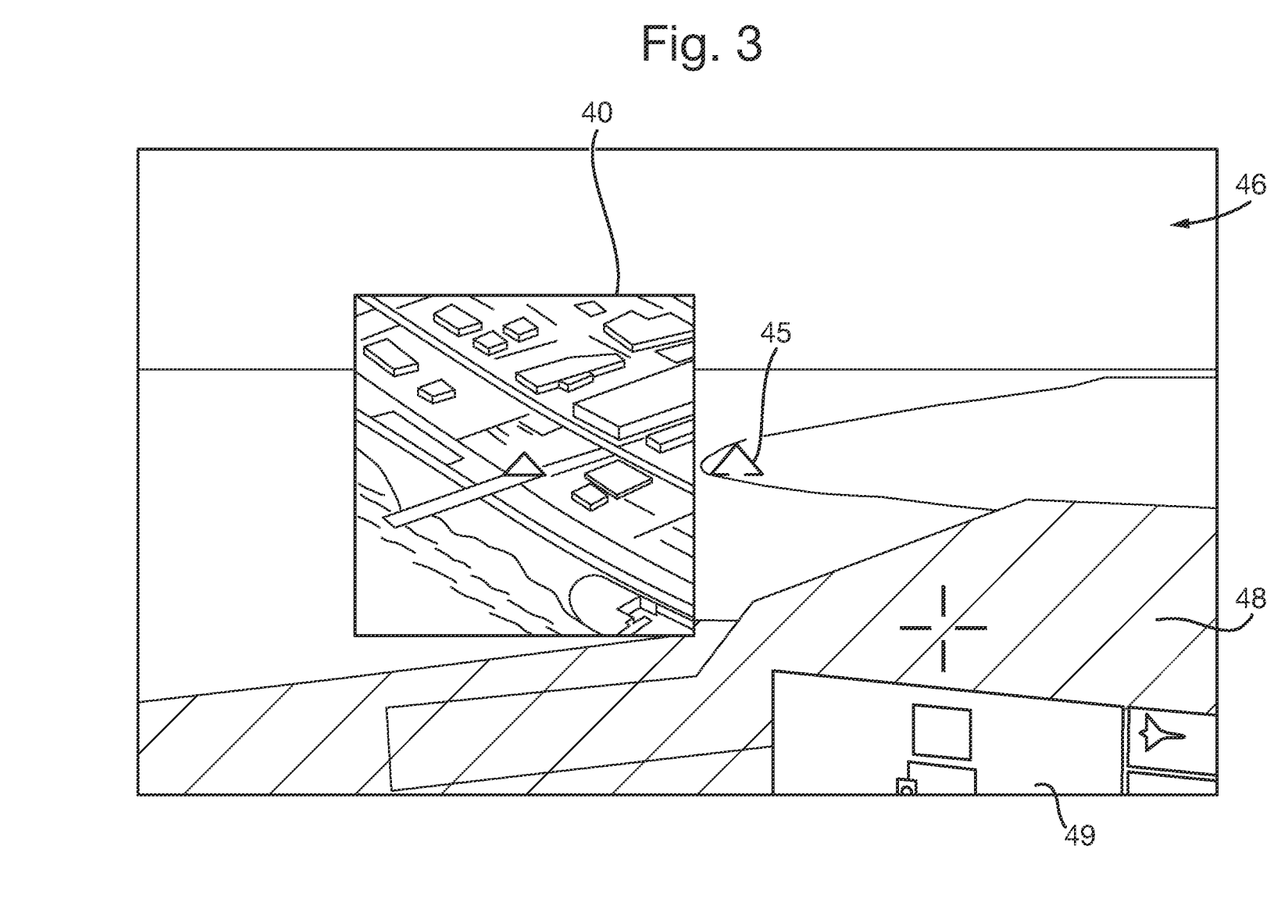
FIG. 3 is an image of a screen of a head-mounted display apparatus according to an exemplary embodiment of the invention, illustrating an augmented reality information window (ARIW) of a Laser Designation Pod (LDP) image superimposed on the head-out display.
Figure 4:
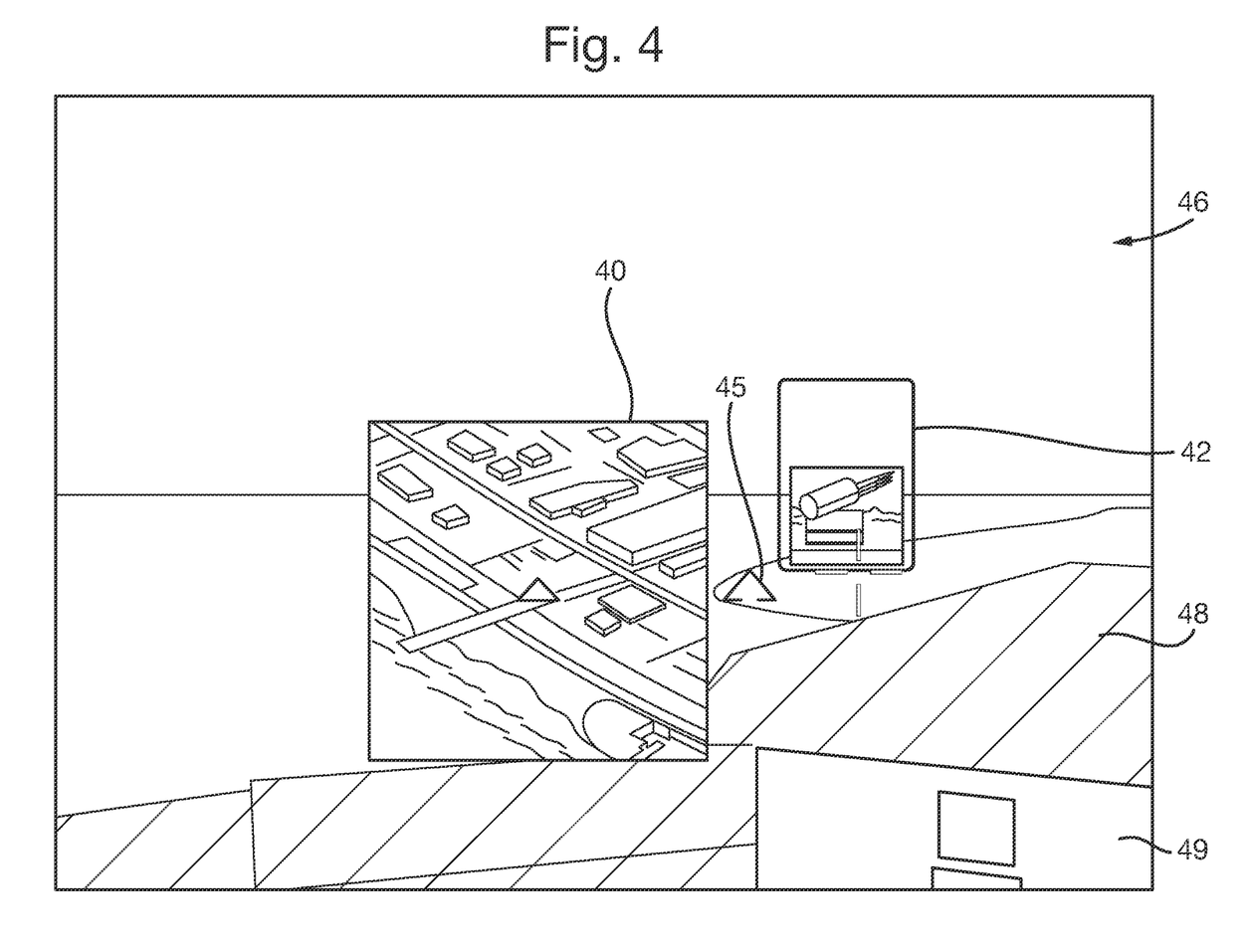
FIG. 4 is an image of an operational area on a screen of a head-mounted display apparatus according to an exemplary embodiment of the invention, illustrating an ARIW of an LDP image, together with a second ARIW comprising a library image of an intended target, superimposed on the head-out display.

In the following, an example of using the apparatus of an exemplary embodiment of the invention is described in respect of a user's interaction with a ground track for targeting. By gazing at a known track (within the augmented reality environment within their view), it can be selected and a control device coupled thereto. The user can now use the control device to slew a Laser Designation Pod (LDP) onto the track and then display an ARIW 40 containing an image of the track. FIG. 3 shows an example of an LDP image displayed in an ARIW. In the example shown, the ARIW of the LDP image is a monochrome image, but it is envisaged that a colour image could instead be displayed. The ARIW 40 is located within the real-world environment 46 next to the point in space 45 where the entity actually resides on the ground, thereby providing instant awareness of what the image actually relates to (As shown in FIG. 3, this point in space is viewed out of the port-side of the cockpit 48). In conventional systems, tasks such as target identification can result in a pilot spending long periods of time looking head-in at LDP images (or other sorts of in-cockpit display 49), whereas by using an exemplary embodiment of the present invention, the image can be observed without the need to look in the cockpit 48. By looking at the ARIW 40 and using the coupled control device (e.g. HOTAS), the image can be zoomed to the required scale or panned. Further interaction may be facilitated by bringing up a menu on the ARIW and using a combination of gaze and the control device to make specific mode selections, e.g. brightness or contrast. FIG. 4 shows the ARIW 40 of the LDP image, together with a second ARIW 42 including a library picture of the intended target to support the pilot in target identification.

Figure 5:
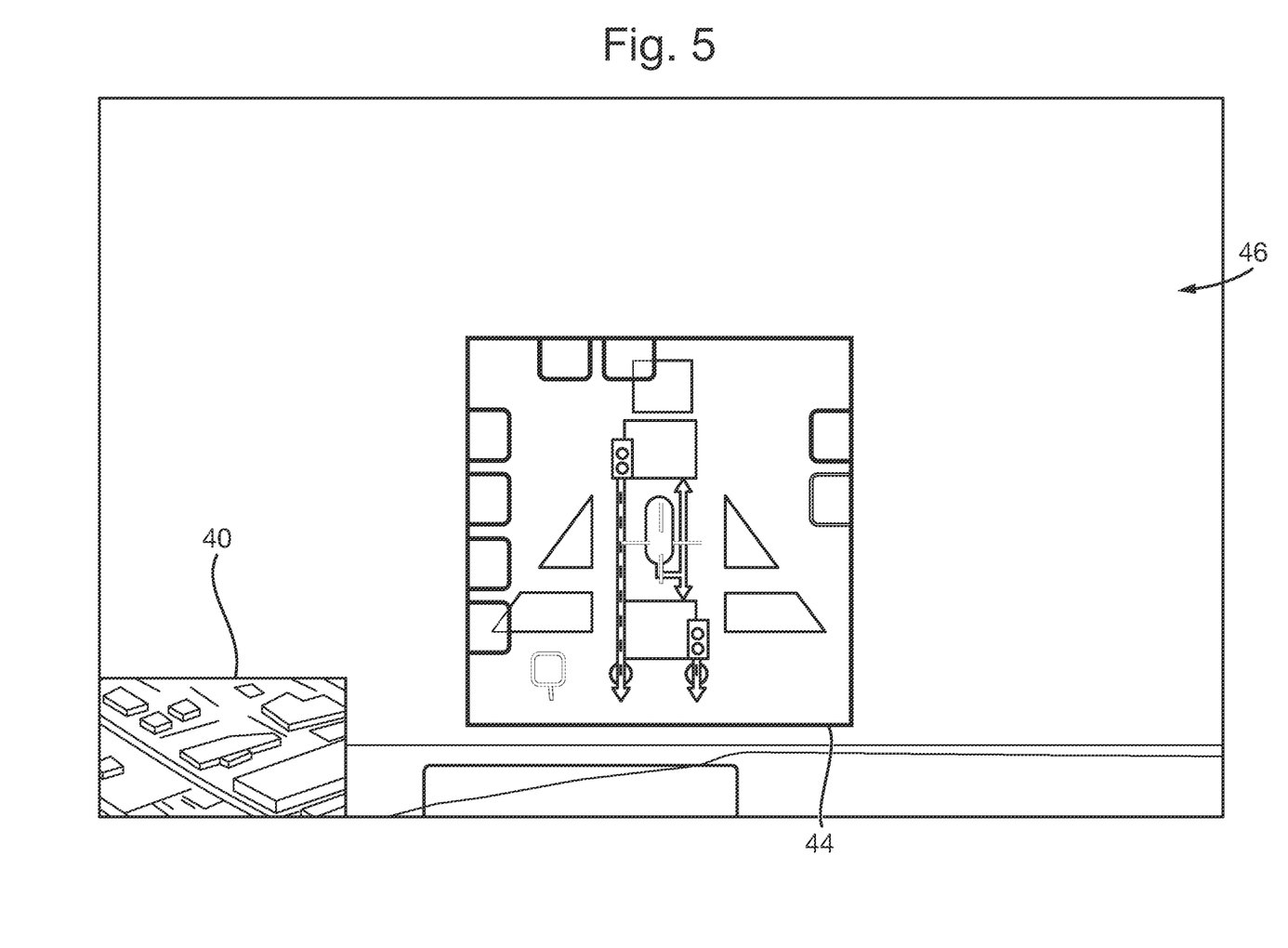
FIG. 5 is an image of an operational area on a screen of a head-mounted display apparatus according to an exemplary embodiment of the invention, illustrating a fuel status ARIW superimposed on the head-out display.

Another specific example of use of an exemplary embodiment of the invention involves gaining awareness of the pilot's own aircraft fuel (or other systems) status while flying in close formation. When flying in close formation to another aircraft, the pilot will want to maintain eyes-on the other aircraft to maintain safe separation. In conventional systems, however, the pilot would need to periodically look in cockpit 48 to find status information such as fuel remaining. In contrast, exemplary embodiments of the invention enable an ARIW to be displayed, providing a fuel display, at a specified gaze position within the head-out display. In a first exemplary embodiment, the fuel display ARIW may be manually dragged and dropped (e.g. using a combination of eye-tracking and control device input, or control device input alone such as gesture recognition, to select an icon corresponding to the fuel display, thereby causing an ARIW to pop-up into the users field of view, and then using further gesture recognition to reposition the ARIW as desired) into the head-out display augmented reality environment achieved by the head-mounted display apparatus of the present invention. The pilot may place the ARIW at a desired location within their view of the external real-world environment 46 so as to minimise obscuration of critical features. Then, the ARIW will be displayed at that location and, when the pilot's gaze is directed at it, a control device coupled thereto. In an alternative exemplary embodiment, a specific location within the pilot's head-out view may be associated with the desired display, and the ARIW may be displayed and a control device coupled thereto in response to the pilot's gaze being directed at that location. A control device will remain coupled to the displayed ARIW only whilst the pilot is looking at it, to enable to perform any desired interaction therewith, and the ARIW is quickly decoupled from the control device(s) (and may, optionally, be removed from the user's view) when the pilot's gaze moves, without the need for the pilot to look away from the aircraft. FIG. 5 illustrates a fuel display 44 with a menu which can be used for specific interactions if required.

It is to be understood that the above provide specific examples of a potential use of the present invention within the specific field of military aircraft, and the present invention is not necessarily intended to be in any way limited in this regard.

It is envisaged that at least high priority functions and menus may be pre-programmed to be displayed within the user's view of the external real-world environment on the screen of the head-mounted display apparatus, such that the respective ARIWs remain within the user's view and, when their gaze is specifically directed at them, a control device is coupled thereto, whereas other (perhaps lower priority) ARIWs can be dragged and dropped into the augmented reality environment from head-in displays as required, and coupled to a control device when the user's gaze is directed thereto.

As discussed above, the control device may be a HOTAS; however it may more specifically be a manually operated input device located on the HOTAS such as a joystick, click-wheel, trackpad or combinations thereof. Moreover, other manually operated input devices could be used such as a gesture recognition device, a mouse, a trackpad, a click-wheel, an array of buttons, or combinations thereof.

Further, it is envisaged that the control device in the present invention may be a voice recognition module.

All of such control devices are provided in addition to the eye tracker module and work alongside the eye tracker module rather than as an alternative thereto. This provision of a two-tiered input approach, that is where the eye tracker module is used to select a functional region and couple the control device to that region (tier 1), and then the control device is used to input further commands to the now-coupled functional region (tier 2), tends to provide an intuitive interface for operators which mitigates the need to divert gaze whilst still making use of eye tracking technology to simplify the command input process.

It will be appreciated by a person skilled in the art, from the foregoing description, that modifications and variations can be made to the described embodiments, without departing from the scope of the invention as defined by the appended claims.

Embodiments described above disclose the use of a screen as the display generating device, configured for relaying light to the viewing device (e.g. visor) and thereby creating human-viewable images. However, as an alternative to a screen, other devices for relaying light to the viewing device and creating images may be provided. In particular, projector technologies and/or optical waveguide technologies could be utilised.

What is claimed is:

1. A head-mounted display apparatus installed within an aircraft and configured to display an operational area, the head-mounted display apparatus comprising:
    a headset configured for placement thereof over a user's eyes within the aircraft, the headset including a viewing device configured to provide to said user, in use, a view of a real-world environment both internal and external to the aircraft;
    a display generating device configured for depicting an operational area, said operational area being defined within said real-world environment and comprising a plurality of functional regions, each functional region defining a different one or more selectable functions or operations that can be performed in respect of said operational area, the apparatus being configured to transfer image data from said display generating device into said user's view of said real-world environment at said viewing device, thereby generating an augmented reality environment;
    a control module including a control device configured to be selectively communicably coupled to all of said functional regions, thereby enabling a user to selectively perform the respective one or more functions or operations associated therewith, wherein the control device is communicably coupled to a selected functional region only in response to a respective actuation signal;
    an eye tracker module configured to monitor said user's gaze relative to said augmented reality environment, in use, and, when said user's gaze is directed at a selected functional region displayed therein, generate and transmit to said control module a said actuation signal, and when said user's gaze is no longer directed at said selected functional region, cause said control device to be decoupled therefrom; and
    an interface adapted to enable the user to select one or more head-down functional regions within a remote head-down display within the aircraft and move the selected head-down functional regions into the display on the viewing device of the head-mounted display apparatus so that the selected head-down functional regions appear within the augmented reality environment external to the aircraft.

2. The head-mounted display apparatus according to claim 1, wherein:
    a plurality of operational areas is defined within said real-world environment, each operational area being associated with a user's relative or absolute head position and/or orientation;
    the apparatus further comprises a head tracking module configured to track and determine a user's relative or absolute head position and/or orientation; and
    the apparatus further comprises a processor that is configured to:
        receive, from said head tracking module, data representative of said user's relative or absolute head position or orientation;
        determine a current operational area associated therewith; and
        define one or more selectable functional regions associated with said current operational area.

3. The head-mounted display apparatus according to claim 1, wherein said viewing device is a transparent or translucent visor, such that an external and internal real-world environment can be viewed by the user, in use, the display generating device being arranged and configured such that image data displayed thereon is transferred into the user's view of the real-world environment through said visor.

4. The head-mounted display apparatus according to claim 1, wherein a functional region is defined and displayed on the viewing device the form of an augmented reality information window, with which the user can interact, using said control device, only when said user's gaze is directed thereto within said augmented reality environment.

5. The head-mounted display apparatus according to claim 4, wherein said augmented reality information window is displayed on the screen when the user directs said gaze at a predefined location within said user's view of the external real-world environment corresponding to a predefined location within a respective operational area, and is removed from the viewing device when the user directs said gaze away from that predefined location.

6. The head-mounted display apparatus according to claim 1, arranged and configured such that whilst the user's gaze is directed at a selected functional region displayed on said viewing device and projected into said user's view of the real-world environment, the control device is coupled thereto to enable interaction therewith, and when the user's gaze moves away from the selected functional region, the control device is decoupled therefrom.

7. The head-mounted display apparatus according to claim 1, wherein when a user's gaze is directed at a selected functional region within a remote head-down display, the control module is configured to communicably couple one or more control devices to said selected functional region, to enable a user to interact therewith, on said head-down display.

8. The head-mounted display apparatus according to claim 6, wherein once a control device has been decoupled from a functional region, such a functional region remains as a selectable functional region within the respective operational area, such that it is once again coupled to a control device when the user's gaze is directed thereto within the augmented reality environment.

9. The head-mounted display apparatus according to claim 1, further comprising a smart interface comprising at least one control device to selectively interact with all functional regions available to the user.

10. The head-mounted display apparatus according to claim 1, wherein the control device comprises a manually operable input device.

11. The head-mounted display apparatus according to claim 10, wherein the control device is provided at a HOTAS.

12. The head-mounted display apparatus according to claim 1, wherein the control device comprises a voice recognition module for inputting commands.

13. A method of displaying an operational area that is external to an aircraft, the method comprising:
providing a head-mounted display apparatus according to claim 1;
placing by a user of the headset of the head-mounted display apparatus over the user's eyes
causing the viewing device of the head-mounted display apparatus to provide to said user a view of a real-world environment both internal and external to the aircraft;
causing the display generating device of the head-mounted display apparatus to depict an operational area, said operational area being defined within said real-world environment;
causing the display generating device of the head-mounted display apparatus to transfer image data created thereby into said user's view of said real-world environment through said viewing device to generate an augmented reality environment;
only in response to an actuation signal, causing the control device of the control module of the head-mounted display apparatus to be selectively communicably coupled to the plurality of functional regions so as to enable the user to selectively perform the respective one or more functions or operations associated therewith;
causing the eye tracker module of the head-mounted display apparatus to monitor said user's gaze relative to said augmented reality environment, and, when said user's gaze is directed at a selected functional region displayed therein, to generate and transmit to said control module a said actuation signal;
when said user's gaze is no longer directed at said selected functional region, causing said control device to be decoupled therefrom; and
selecting by the user, using the interface, of one or more head-down functional regions within a remote head-down display within the aircraft, and moving by the user of the selected head-down functional regions into the display on the viewing device of the head-mounted display apparatus, so that the selected head-down functional regions appear within the augmented reality environment external to the aircraft.

* * * * *